United States Patent [19]

Handy et al.

[11] 4,091,661
[45] May 30, 1978

[54] METHOD AND APPARATUS FOR DETERMINING STRESS UNDERGROUND

[75] Inventors: Richard L. Handy, Ames; Eldon Glen Ferguson, Des Moines, both of Iowa; Richard D. Barksdale, Atlanta, Ga.; Nathaniel S. Fox; Gary Trott, both of Marietta, Ga.

[73] Assignee: Geotechnical Research, Inc., Marietta, Ga.

[21] Appl. No.: 732,940

[22] Filed: Oct. 15, 1976

[51] Int. Cl.² .............................................. G01B 5/30
[52] U.S. Cl. .................................................. 73/88 E
[58] Field of Search ................... 73/88 E, 151, 88 R, 73/84

[56] References Cited

U.S. PATENT DOCUMENTS

| | | | |
|---|---|---|---|
| 2,258,001 | 10/1941 | Chamberlain | 73/151 |
| 3,286,514 | 11/1966 | Anderson | 73/88 E |
| 3,372,577 | 3/1968 | Bates et al. | 73/88 E |
| 3,427,876 | 2/1969 | Steele et al. | 73/88 E |
| 3,442,123 | 5/1969 | Broise | 73/88 E |
| 3,503,254 | 3/1970 | Menard | 73/88 E |

FOREIGN PATENT DOCUMENTS 568,912  1/1933  Germany .................. 73/84

Primary Examiner—Richard C. Queisser
Assistant Examiner—Anthony V. Ciarlante
Attorney, Agent, or Firm—Newton, Hopkins & Ormsby

[57] ABSTRACT

Apparatus and process of determining stress underground, the apparatus having a central standard or shaft provided with a sensing head formed of equally circumferentially spaced, radially extending blades or vanes carried at the lower end portion of the shaft. Sensor elements or cells are carried within each blade, each sensor element having a pair of spaced, deformable, deflection diaphragms separated by a porous interior. The sensor head is inserted directly into the ground or lowered through a hollow auger to project into the ground, therefrom. In other embodiments, the sensor head is carried by a flexible actuator riding in a curved track of a housing. The head, which may be a single blade or a plurality of blades with embedded sensor cells, is recessed in the housing and is projected sidewise from the housing by manipulation of the actuator.

The process includes embedding these blades or vanes in the ground in prescribed directions, and thus by using fluid pressure, deflect the diaphragms so as to detect the pressure drop due to deflection on remote instruments located at the surface of the ground.

16 Claims, 8 Drawing Figures

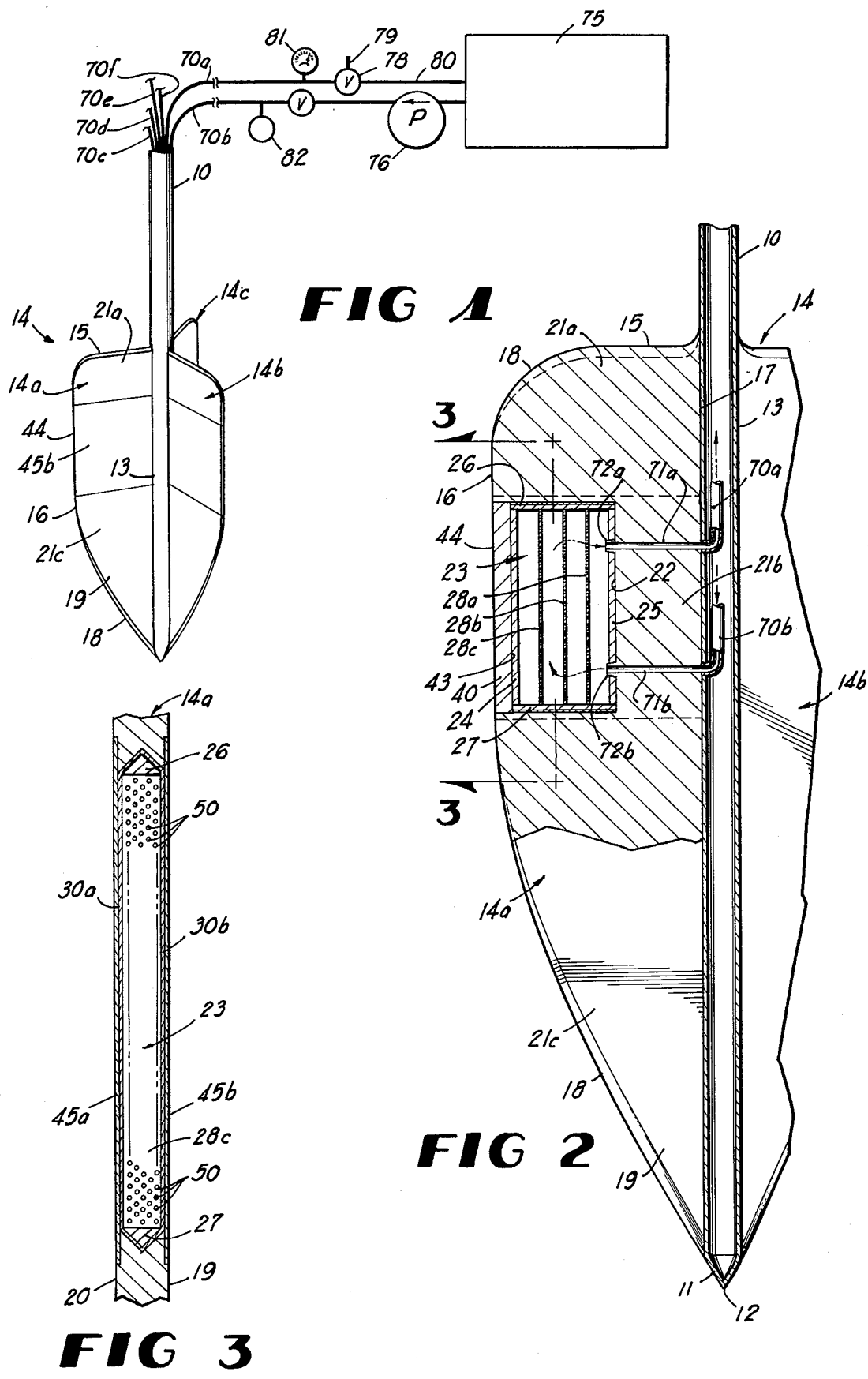

METHOD AND APPARATUS FOR DETERMINING STRESS UNDERGROUND

BACKGROUND OF THE INVENTION

1. Field of the Invention

This invention relates to a method and apparatus for determining stress underground and is more particularly concerned with a vane stress sensor and process of using the same.

2. Description of the Prior Art

In the past, it has been extremely difficult to measure the stress in subsurface soil. Simultaneous direction oriented measurements have not, to our knowledge, been undertaken.

Applicant is, however, aware of U.S. Pat. No. 3,499,320.

In 12 *Canadian Geotechnical Journal,* Pages 143, 144 the prior art Glotzl earth pressure cell is described. This Glotzl measuring system is described as having a steel cell containing and confining oil adjacent a membrane. Air under pressure deflects the membrane toward the oil to open the valve so that the air is then returned, through a second tube when the membrane is deflected by pressure equalization. Another Glotzl type device is the pore water pressure cell which includes a flexible membrane within a porous cell. Water flows from the exterior into the cell to exert pressure to tend to close the membrane diaphragm. When air pressure on the other side of the membrane diaphragm overcomes this pressure, the valve is opened to return the air. Bubbles in the water container indicate that the valve has been opened and thus the air pressure gauge is read as an indication of the corresponding pressure adjacent to the cell.

The prior art instruments described above are expensive, difficult to install, give only very approximate readings, read only lateral stress perpendicular to the cell, give no simultaneous readings, and do not give stress readings in a vertical direction. The present invention, which overcomes these defects, provides a device and a process by which stress in several directions can be simultaneously or selectively measured.

SUMMARY OF THE INVENTION

Briefly described, the present invention includes a vertically inserted sensor member formed by a rigid, hollow, cylindircal tubular shaft or standard provided with a sensing head including a hub closed at its lower end and circumferentially equally spaced, radially extending flat vanes or blades projecting from the hub, the planes of the blades being axially disposed. Embedded in each vane is a thin pressure detecting element or cell which has a rigid, foraminous core covered, on opposite sides, by spaced opposed deflection plates or diaphragms. The outer surfaces of the diaphragms are flush with the surfaces of the vanes.

In a modified form of the invention the laterally inserted sensor members, each include a rigid guide track standard within which a flexible actuator rides. The lower end of the track communicates with a curved passage in a housing while the lower end of the flexible actuator carries the sensing head. The head has one or a plurality of vanes or blades each having a detecting cell for insertion in a sidewise direction into the ground from a concealed recessed position in the housing.

For each detecting cell, a pair of conduits extends down and communicates through passageways with the interior of the cell. The upper ends of these tubes pass up through the standard and communicate with a source of pressurized fluid and with valves and gauges by which the supply of fluid and fluctuation in pressure of the fluid for each cell can be individually monitored.

Each cell measures the force exerted against the diaphragms since, as the fluid pressure is built up within the cell and is equalized with the outside pressure, the skin like metallic films from which the deflector plates are made will be deformed outwardly, thereby providing a momentary pressure drop detectable by its pressure gauge. A plotting of several such pressure readings will permit extrapotation to compensate for the thickness of the vane.

BRIEF DESCRIPTION OF THE DRAWING

FIG. 1 is a fragmentary perspective view of the end portion of a main or vertically inserted sensor constructed in accordance with the present invention, the fluid conduits of one cell of the sensor being shown as connected diagramatically to a source of fluid through a pump;

FIG. 2 is a partially broken away side elevational view of the end portion of the main sensor shown in FIG. 1;

FIG. 3 is a vertical sectional view taken substantially along line 3—3 in FIG. 2;

DETAILED DESCRIPTION OF THE DRAWING

Figure 4:
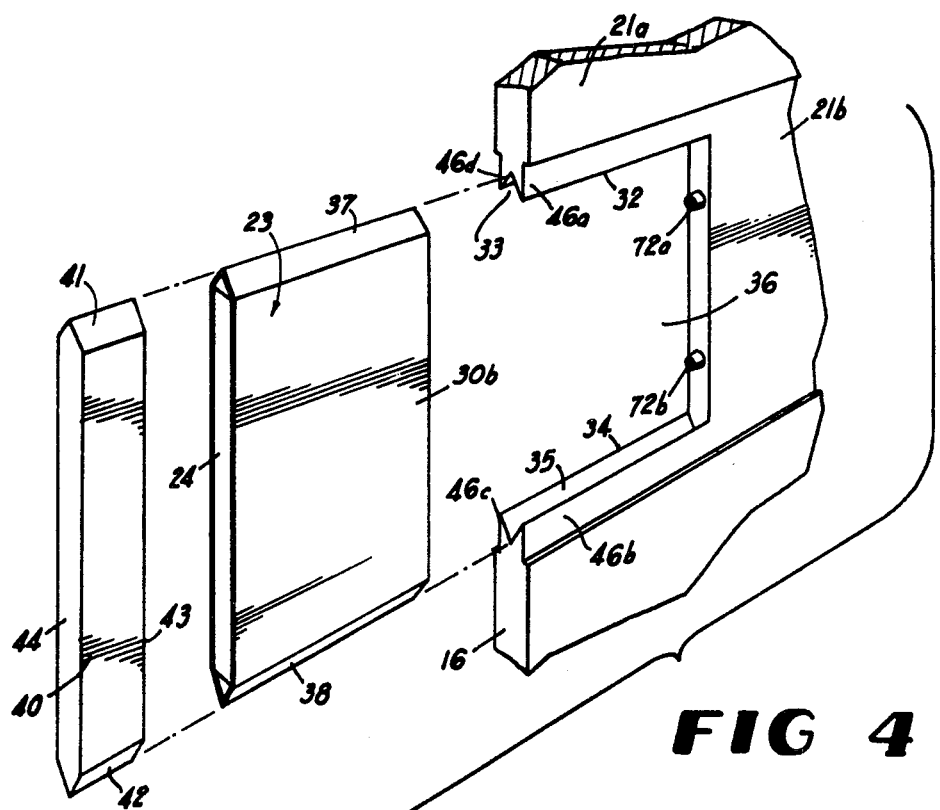
FIG. 4 is an enlarged, fragmentary perspective view of a portion of one of the vanes of the sensor shown in FIG. 1.

Referring now in detail to the embodiments chosen for the purpose of illustrating the present invention, numeral 10 denotes the straight tubular hollow shaft of the main or vertically insertable sensor, the lower portion of which forms a head 14 having a hub 13, the end 11 of which tapers inwardly to a lower point 12. Thus, the lower end of the shaft 10, i.e. hub 13, is closed by end portion 11. Radiating from the hub 13 of shaft 10, immediately above the lower end portion 11 are a plurality of circumferentially equally spaced vanes 14a, 14b, 14c each of which is identical in construction and, therefore, only a single vane 14a will be described in detail.

Vane 14a is a composite, flat, thin metal member, the body of which has a straight radially extending upper edge 15, a straight axially extending outer edge 16 and a straight axially extending inner edge 17. The outer edge 16 is parallel to the inner edge 17 and is joined to edge 15 along a curved upper corner portion 18. At approximately the center portion of the vane 14a, the edge 16 gradually curves, inwardly to provide an arcuate, inwardly tapering lower edge 18 which joins edge 17 adjacent end portion 11. This edge 18 is bevelled on both sides so as to provide a knife-like cutting member for easy penetration into the ground. The vane 14a is also provided with a pair of flat parallel opposite side surfaces 19 and 20.

The vane 14a includes an upper vane panel 21a, a central vane panel 21b and a lower pane panel 21c in alignment with each other, the central vane panel 21b being rectangular, smaller and slightly thinner than and between the panels 21a, 21c, its outer, axially extending, straight edge 22 being spaced inwardly of edge 16 to define a cell receiving space within vane 12a, within which the sensing element or cell 23 is received.

In more detail, the sensing cell 23 includes a rectangular inner frame formed by a pair of vertically or axially extending side bars 24 and 25, the upper and lower ends of which are joined by a pair of axially extending top and bottom bars 26 and 27, respectively. The top bar 26 and the bottom bar 27 are spaced axially from each other and the side bars 24 and 25 are spaced raidally from each other to define a rectangular perimeter frame for the cell 23, the frame defining a hollow interior in which is disposed, parallel, equally spaced, axially extending, foraminous ribs 28a, 28b and 28c. The ends of ribs 28a, 28b and 28c are secured to the inside surfaces of top and bottom bars 26 and 27.

All of the elements i.e. bars 24, 25, 26, 27 and ribs 28a, 28b, 28c, forming the frame are of the same width, however, the top and bottom bars 26 and 27 in cross-section are triangular. The other bars 26 and 27 and ribs 28a, 28b, 28c are rectangular in cross-section.

The ribs 28a, 28b, 28c in the present embodiment are metal rectangular members provided with a plurality of holes 50 through which the fluid will flow.

Wrapped around the frame is a metal foil film which provides the two parallel, rectangular, deformable deflection plates 30a and 30b. The plate 30a is of approximately the same perimetral dimensions as the frame so that its perimetral portions can be and are joined by brazing or adhesive to the outer surfaces of bars 24, 25, 26 and 27. In like manner, the perimeter or plate 30b is secured to bars 24, 25, 26 and 27. Thus, the plates 30a and 30b seal the frame and lie flat against the surfaces of ribs 28a, 28b and 28c.

As best seen in FIG. 4, the straight lower edge 32 of panel 21a, outwardly of panel 21b, extends in a radial direction and is provided with a downwardly opening, V-shaped groove 33. In like fashion, the upper edge 34 of lower panel 21c is provided with an upwardly opening V-shaped groove 35.

Thus, the axial edge 22 and the upper and lower edges 34 define a cell receiving recess 35 into which the cell 23 may be urged, with its tapered or bevelled upper edge portion 37 being slideably received in recess 33 as its lower bevelled portion 38 is received in recess 35 until the bar 25 abuts the edge 22.

For protecting the outer edge of cell 23 from being deformed, a rectangular reinforcing block 40 of the same thickness as cell 23 is provided. Block 40 also has bevelled edges 41 and 42 which are received in recesses 33 and 35, the block 40 being of such a width that when its inner axial edge 43 abuts bar 24, its outer axial edge 44 is aligned and becomes part of edge 16 of the vane 14a.

The vane 14a, in its central portion, is milled out so that the lower edge portion of upper panel 21a, the upper edge portion of panel 21c and the entire central panel 21b are of reduced thickness, sufficient to provide grooves 46a, 46b, 46c and 46d for receiving the deformable of flexible metal shields 45a and 45b which are larger than and totally overlie the plates 30a and 30b of cell 23, respectively. The plates 30a, 30b and shields 45a, 45b are contiguous forming spaced diaphragms. A diaphragm made from a single sheet of metal may be employed for the plate and shield, if desired.

For providing a passageway for fluid under pressure to be supplied to the interior of cell 23, a plurality of fluid conduit tubes 70a, 70b, 70c, 70d, 70e project from the uppermost end of shaft 10 down through the hollow interior of shaft 10. Tube 70a communicates, through the wall of hub 13 of shaft 10, with a radially extending conduit, passage or bore 71a in central panel 21b. The tube 70b communicates with a similar conduit, bore or passage 71b, parallel to and below passage 71a. The outer terminals of passages 71a, 71b are provided with nipples 72a, 72b which protrude through and are received in appropriate openings in bar 25. Hence, fluid can be supplied from the surface through either tube 70a or 70b, via passages 71a or 71b, into the interior of cell 23. The tubes 70c and 70d are similarly connected to a cell, such as cell 23, of a second vane 14b and the tubes 70e and 70f are connected to a cell, such as cell 23 of the third vane 14c.

Each pair of tubes, such as tube 70a, 70b, is connected to a source of fluid, such as container 75. One line or tube such as tube 70b, is supplied with fluid, via a pump or compressor 76 and a valve 77. The other line or tube, such as tube 70a, is connected to a three way valve 78 which selectively discharges the return fluid to the atmosphere, via conduit 79, or returns the fluid to the container 75, via return line 80.

Figure 8:
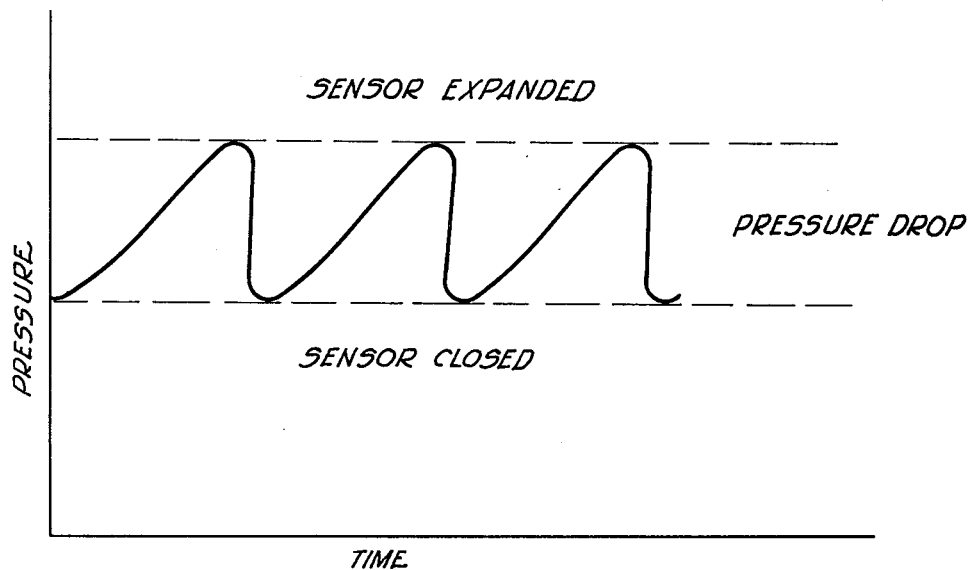
FIG. 8 is a diagram of a time-pressure graph.

It will be understood by those skilled in the art that the sensing head 14 is to be inserted axially, i.e., vertically into the ground and driven therein by the force on the upper end of shaft 10. Since the vanes 14a, 14b, 14c are relatively thin, they do not appreciably deflect the ground as the sensing head 14 enters the ground and, hence, head 14 will not materially alter the lateral pressure which will be detected by the cells, such as cell 23. When the fluid is pumped into the cell 23 and sufficient pressure is built up in the cell 23 to deflect the diaphragms, i.e., plates 30a 30b and the shields 45a, 45b within their elastic limits, the deflection of these diaphragms will be detected by a momentary drop in pressure of gauge 81 and gauge 82, the gauge 81 being connected to tube 70a and the gauge 82 being connected to tube 70b. In FIG. 8, it is depicted, by way of illustration, that the pressure, as read on the gauges, for a single cell 23 will progressively be built up until, as the pressure of the fluid on the interior of the cell 23 equalizes with and becomes greater than the lateral pressure of the ground perpendicular to the diaphragms, i.e. shields 45 or 45b, the diaphragms will deflect outwardly, increasing the volume of cell 23. With incompressible liquids, as the fluid within passageways 70a, 70b and cell 23, even this small increase in volume will be sufficient to show that the lateral pressure of the ground has been equalized.

By providing a pump 76 which will impart a pulsation to the pressure of the fluid, the diaphragms, i.e. shields 45a, 45b and plates 30a, 30b, can be caused to pulsate in and out in response thereto, provided the lateral ground pressure has been equalized. Thus, a pressure v. time curve is generated corresponding to the diagram of FIG. 8.

Gases of all kinds, as well as liquids, are useable as a fluid in the pressure systems of the present invention, except, however, it is recommended that the use of a gas which either liquifies or solidifies under the pressure and temperature conditions existing in the ground being investigated should be preferably not used since a phase equilibrium condition might cause erroneous readings.

By the reading of gauges, similar to gauges 81 and 82 which are connected to the tubes 70c, 70d, 70e and 70f, not only can the stress perpendicular to the surfaces of the diaphragms, i.e. shields 45a and 45b of a particular vein 14a, 14b, 14c be read, but through comparison of readings between the respective cells 14a, 14b, 14c the direction and magnitude of the stress can also be ascertained.

Figure 6:
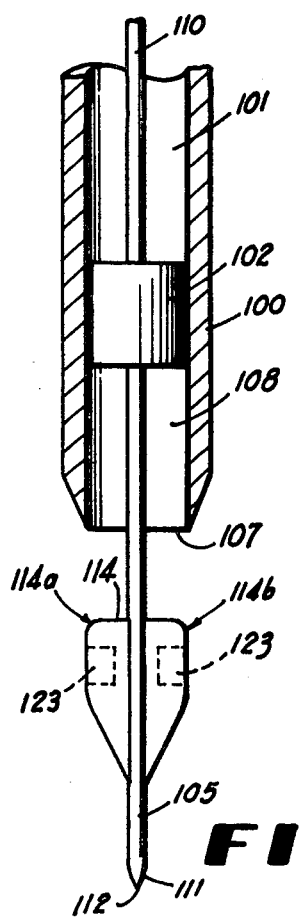
FIG. 6 is a vertical sectional view of a sensor similar to the sensor of FIG. 1 within a hollow auger.

In FIG. 6, it is seen that, if sensor such as the sensor of FIGS. 1-4, is to be used for deep, sub-surface measurements, a hollow stem auger 100 is passed down into the ground to be measured. Thereafter, the material in the hollow bore 101 of the auger 100 is removed, using conventional equipment. After this, a stress sensor having a head 114, with vanes such as vanes 114a, 114b and sensing elements such as element 123 constructed substantially identically to the vanes 14a, 14b and 14c and the sensors 23, can be inserted through the hollow bore 101 and axially into the ground therebelow so as to be embedded therein.

In the embodiment shown in FIG. 6, a radial thrust bearing 102 is mounted in the end of a hollow stem auger 100 so as to guide the hollow shaft 110 which carries the head 114.

If desired, the hollow shaft 110 can be extended below the vanes 114a, 114b, to act as an advance probe 105 having a point 112 and a conically tapered end portion 111. This probe 105 will detect the presence of hard rocks and other things which cannot be penetrated by the head 114.

It may be found desirable to install the thrust bearing 102 in the bore 101, prior to the insertion of the auger into a predrilled hole in the ground. In this arrangement, the head 114 is recessed into the space 108 in the bore 101 between the mouth 107 and the radial thrust bearing 102. Then the auger 100 is passed down into the pre-bored hole in the ground to the bottom thereof and the head 114 thereafter thrust downwardly through manipulation of the shaft 110. Bearing 102 maintains the head 114 concentrically within auger 100 while permitting standard 110 to slide axially therein.

By progressively lowering the head 114, successive readings can be taken and plotted on a graph. Then, through interpolation the pressure reading at the bottom of the hole and even at lesser depths can be calculated.

Figure 5:
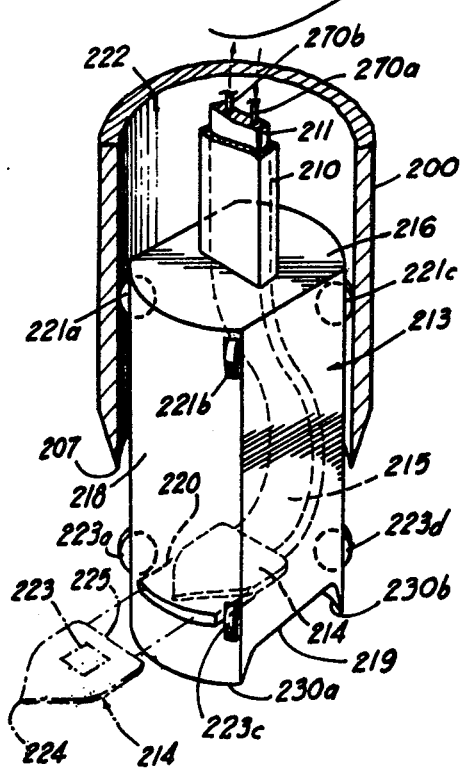
FIG. 5 is a fragmentary perspective view of a second embodiment of the present invention showing a sidewise insertable sensor within a hollow auger.

In FIG. 5, an apparatus is illustrated for obtaining vertical stresses. This apparatus can be utilized instead of or before or after the appratus of FIGS. 1-5 have been employed to determine the lateral stresses. The apparatus of FIG. 5 includes a rigid rectangular shaft, track or standard 210, within which is disposed an actuator such as a flexible, flat, rectangular, metal tape, tongue 211. passageways are provided in the actuating member or tongue 211 which lead to tubes 270a and 270b for permitting the flow of fluid into and out of the pressure system. The lower end of the rigid tubular shaft or standard 210 carries a sensor body or housing 213 within which the sensor member 214 is recessed. An arcuate passageway 215 in housing 213 leads downwardly from the upper end 216 of housing 213, curving first laterally outwardly, toward one side and then gradually curving downwardly and then outwardly in the opposite direction. The mouth 217 of the passageway 215 opens on the side 218 of housing 213, adjacent its bottom end 219. The passageway 215 is widened, at numeral 220, to provide a horizontaly extending throat or recess, which receives the first sensing head 214, totally recessed therein.

Circumferentially spaced upper rollers, such as upper rollers 221a, 221b and 221c, protrude outwardly from the sides of the body 213 for the purpose of engaging the inner periphery 222 of a cylindrical hollow stem auger 200. The function of the housing 213 is to ride upwardly and downwardly in the hollow interior of the hollow stem auger 200, being manipulated by standard 210. Additional, lower rollers, such as rollers 223a, 223b and 223c, are provided at the lower portion of the housing 213. Rollers 223a, 223b, 223c engage the inner periphery 222 below rollers 221a, 221b, 221c.

The construction of the sensing head 214 is of essentially the same construction as one of the vanes 14a, 14b or 14c in that it has a sensor element or cell 223 in its central portion. The vane 214 is a thin, flat rigid member of a different shape than the vanes 14a, 14b, 14c in that it is symmetrical and has leading edges which both taper forwardly to a point 224, as well as a straight transverse rear edge 225 which is connected to the lower end of the flexible metal tongue or actuator 211.

The lower end 219 of the housing 213 is provided with a forward, downwardly extending, arcute knife edge 230a and a rear, downwardly extending arcuate knife edge 230b which are concentric with each other and protrude downwardly below bottom 219 so as to engage the soil of the hole and dig into it.

In use, after a hole has been dug into the earth by the hollow stem auger 200, the auger is removed from the hole by a distance less than the length of the body 213. Thereafter, the body 213 is thrust down within the bore of the auger 200, the rollers 221a, 221b, 221c and 223a, 223b and 223c riding against the inner surface of periphery 222. Since the rectangular standard 210 is rigid, it can be utilized to manipulate the body 213 so as to urge it down through and out of the bottom or mouth 207 of the auger 200, sufficiently so as to expose the mouth 217 below the mouth 207. The blades 230a and 230b may dig into the dirt at the bottom of the hole, if necessary, in order to prevent or arrest appreciable lateral movement of the housing 213. Of course, the upper portion of the housing 213 remains in the end portion of the auger 200 and, therefore, the auger 200 will, itself, prevent lateral movement. Thereafter, the tape or flexible tongue or actuator 211 is moved downwardly within standard 210 so as to thrust the head 214 out from its confinement in the recess 220, as illustrated in broken lines, to the extended position illustrated in broken lines in FIG. 5, thereby causing the head 214 to penetrate sidewise into the dirt or soil of the hole. This disposes, the cell 223 to detect vertical forces or stress in the ground. The cell 223 can then be operated in the manner in which cell 23 is operated.

Figure 7:
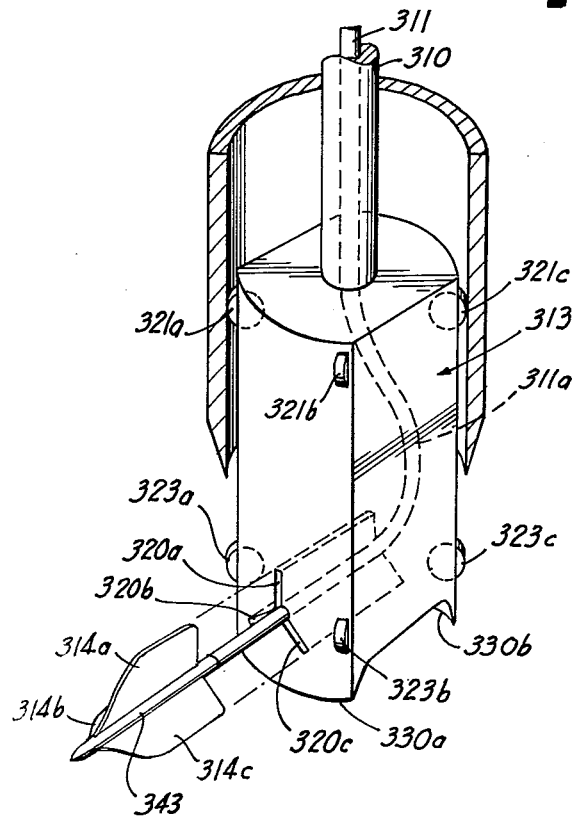
FIG. 7 is a view similar to FIG. 5 but showing a second embodiment of the sidewise insertable sensor.

In FIG. 7, a modified form of the device, shown in FIG. 5 is illustrated, wherein a straight, circular rigid tube or standard 310 forms a guide track containing a hollow actuator 311, the end 311a of which is flexible and passes through an arcuate passageway in the body 313, its lower end being secured to a sensing head 314 having three vanes 314a, 314b nd 314c identical to vanes 14a, 14b, 14c. The vanes 314a, 314b and 314c radiate from hub 343 and are initially carried within slots, such as slots 220a, 220b and 220c, which conform to the dimensions of the vanes.

The lower portion 311a of actuator 311 is sufficiently flexible so as to readily move in the arcute passageway 315. Any of a number of flexible tubes can be used for actuator end portion 311a. For example, a helically wound metal tube is suitable.

The vanes or blades 14a, 14b, 14c or 314a, 314b, 314c are disposed 120° from each other around hub 13 or 343. This enables readings from their respective cells to indicate stress in many different directions. Using housings, such as 213 or 313, the head can be inserted into the ground at any prescribed angle with respect to the hole. Also through measuring the length of thrust of actuator 211 or 311, the distance of penetration of the head 214 or 314 can be measured.

What is claimed is:

1. A sensor comprising:
   (a) a standard;
   (b) a sensing head carried on said standard, said sensing head including, a flat vane projecting from said standard, and a sensing cell within said vane, said sensing cell being of approximately the same thickness as said vane and having a deformable diaphragm with an outer surface being approximately coplanar to a surface of said vane;
   (c) conduit means for directing fluid under pressure into said cell to deform said diaphragm outwardly when the exterior pressure on said diaphragm is exceeded by the pressure of said fluid; and
   (d) means for monitoring the fluid to detect when the fluid has deformed the diaphragm.

2. The sensor defined in claim 1 including a housing having a recess within which said vane is carried, said recess having a sidewise opening mouth through which said vane can be projected, and wherein said standard includes means for raising and lowering said housing within a hole in the ground, and means for projecting said vane sidewise out of said mouth into the ground defining the side of said hole.

3. The sensor defined in claim 1 wherein said standard has an axis and said vane projects radially of said axis from said standard and including additional vanes circumferentially spaced from said vane about said axis and also projects radially from said standard.

4. The sensor defined in claim 1 wherein said cell includes a deformable second diaphragm on the side of said cell opposite to the first mentioned diaphragm, the surface of said second diaphragm being approximately coplanar with the surface of said flat vane.

5. The sensor defined in claim 4 wherein said conduit means includes tubes passing through said standard and communicating with interior of said cell.

6. The sensor defined in claim 4 wherein said cell includes a core of rigid, foraminous material which resists deformation of said diaphragms inwardy.

7. In a sensor for determining underground stresses, a sensing head having:
   (a) a central hub disposed along an axis;
   (b) a plurality of vanes radiating from said central hub, each of said vanes being a flat, axially extending member joined to said hub by its innermost edge;
   (c) a plurality of sensing cells within said vanes;
   (d) means connected to said cells for determining the stress exerted on each cell; and
   (e) means for transmitting such determinations to a position remote from said head.

8. The sensor defined in claim 7 wherein each cell includes a deformable diaphragm and said means includes members for determining the magnitude of pressure on said diaphragm.

9. The sensor defined in claim 7 wherein the outer edges of said vanes taper toward each other as they approach one end of said hub.

10. In a process of determining stress underground, the steps of:
    (a) embedding a plurality of vanes, radiating from a common axis and having flat radial surfaces, into the ground so that they are radially spaced from each other around said axis; and
    (b) measuring the pressure exerted on the flat surfaces.

11. The process defined in claim 10 in which said axis is vertically disposed.

12. The process defined in claim 11 wherein:
    (a) said vanes are disposed in a hole in the ground; and
    (b) said vanes are simultaneously urged in a sidewise direction into the ground defining the side of the hole.

13. The process defined in claim 11 wherein said vanes are progressively and simultaneously urged to different depths in the ground and said measuring is made for each depth.

14. The process defined in claim 10 wherein each vane includes a hollow sensing cell provided with diaphragms for detecting the pressure, and fluid under pressure is fed from a source of fluid under pressure to the interior of said cell.

15. The process defined in claim 14 in which said vanes are secured to a common hub and said planes intersect along the axis of said hub.

16. The process defined in claim 14 wherein a pulsating pressure is imparted to the fluid.

* * * * *